United States Patent
Heidjann et al.

(10) Patent No.: US 7,200,981 B2
(45) Date of Patent: Apr. 10, 2007

(54) SUPPORT WHEEL ARRANGEMENT FOR AGRICULTURAL WORKING MACHINE, AND AGRICULTURAL WORKING MACHINE PROVIDED THEREWITH

(75) Inventors: Franz Heidjann, Harsewinkel (DE); Bernd Holtmann, Sendenhorst (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 20 days.

(21) Appl. No.: 10/170,090

(22) Filed: Jun. 12, 2002

(65) Prior Publication Data
US 2003/0000194 A1    Jan. 2, 2003

(30) Foreign Application Priority Data
Jun. 27, 2001    (DE) ............... 101 30 645

(51) Int. Cl.
A01D 34/00    (2006.01)
(52) U.S. Cl. ......................... 56/17.2; 56/14.7
(58) Field of Classification Search ................. 56/14.7, 56/15.8, 17.2, 1, 280, DIG. 3, DIG. 10
See application file for complete search history.

(56) References Cited

U.S. PATENT DOCUMENTS

| | | | | | |
|---|---|---|---|---|---|
| 2,739,017 A | * | 3/1956 | Arps | ...................... | 305/182 |
| 3,107,128 A | * | 10/1963 | Ruane | ...................... | 305/178 |
| 3,275,386 A | * | 9/1966 | Bexten | ...................... | 305/155 |
| 3,572,446 A | * | 3/1971 | Mazzarins | ...................... | 172/830 |
| 3,791,114 A | * | 2/1974 | Fowler | ...................... | 56/13.9 |
| 3,828,532 A | * | 8/1974 | Fickle et al. | ...................... | 56/14.4 |
| 4,409,778 A | * | 10/1983 | McNaught | ...................... | 56/10.2 A |
| 4,507,910 A | * | 4/1985 | Thornley et al. | ...................... | 56/10.2 E |
| 4,515,221 A | * | 5/1985 | van der Lely | ...................... | 172/3 |
| 4,516,649 A | * | 5/1985 | Braathen | ...................... | 180/9.1 |
| 4,532,725 A | * | 8/1985 | Trejo et al. | ...................... | 37/243 |
| 4,845,931 A |  | 7/1989 | Bruner et al. | | |
| 5,058,294 A | * | 10/1991 | Bryan, Jr. | ...................... | 37/190 |
| 5,176,573 A | * | 1/1993 | Dow | ...................... | 460/42 |
| 5,191,952 A | * | 3/1993 | Satzler et al. | ...................... | 180/9.52 |
| 5,279,378 A | * | 1/1994 | Grawey et al. | ...................... | 180/9.21 |
| 5,339,611 A |  | 8/1994 | Roderfeld | | |
| 5,340,205 A | * | 8/1994 | Nagorcka | ...................... | 305/132 |
| 5,361,860 A | * | 11/1994 | Smith et al. | ...................... | 180/9.21 |
| 5,566,773 A | * | 10/1996 | Gersmann | ...................... | 180/9.5 |
| 5,575,716 A | * | 11/1996 | Jennen | ...................... | 460/116 |
| 5,639,148 A | * | 6/1997 | Sheidler | ...................... | 305/116 |

(Continued)

FOREIGN PATENT DOCUMENTS

DE    1108972    1/1962

(Continued)

*Primary Examiner*—Thomas B. Will
*Assistant Examiner*—Alicia Torres
(74) *Attorney, Agent, or Firm*—Michael J. Striker

(57) ABSTRACT

A supporting arrangement for an agricultural working machine with at least one receiving device for receiving an agricultural working device has at least one support wheel arrangeable in a region facing the agricultural working device, the at least one support wheel being arranged forwardly of the at least one land wheel of an axle of the agricultural working machine as considered in a traveling direction, and a common envelope structure surrounding the at least one support wheel and the at least one land wheel located after the at least one support wheel as considered in the traveling direction.

19 Claims, 2 Drawing Sheets

U.S. PATENT DOCUMENTS

| | | | |
|---|---|---|---|
| 6,033,044 A * | 3/2000 | Brinkrolf | 305/194 |
| 6,234,590 B1 * | 5/2001 | Satzler | 305/132 |
| 6,374,702 B1 * | 4/2002 | Scheid et al. | 74/730.1 |
| 6,550,505 B2 * | 4/2003 | Nault et al. | |

FOREIGN PATENT DOCUMENTS

| | | |
|---|---|---|
| DE | 71 019 95.9 | 4/1972 |
| DE | 199 18 551 A1 | 10/2000 |

* cited by examiner

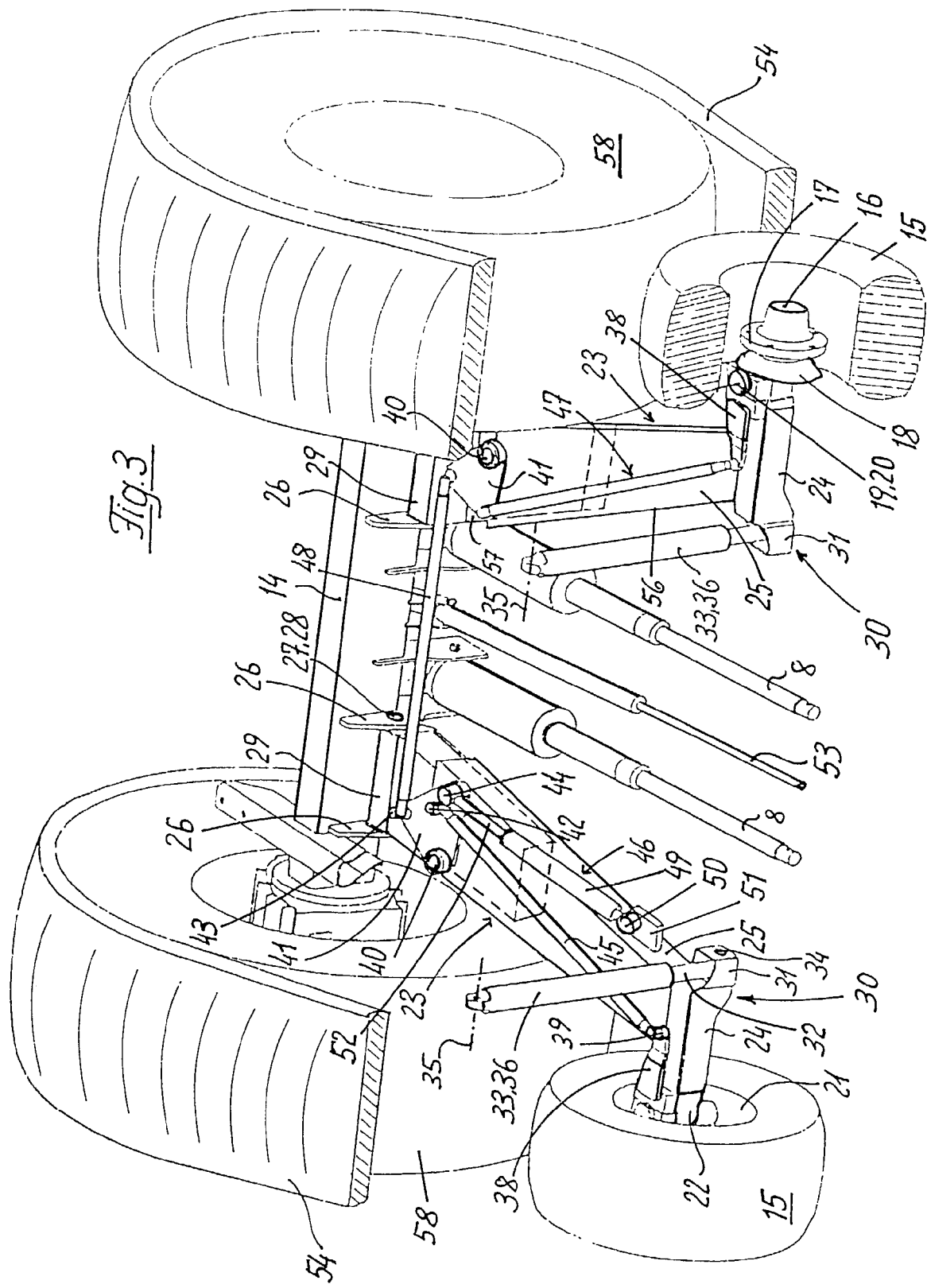

SUPPORT WHEEL ARRANGEMENT FOR AGRICULTURAL WORKING MACHINE, AND AGRICULTURAL WORKING MACHINE PROVIDED THEREWITH

BACKGROUND OF THE INVENTION

The present invention relates to a support wheel arrangement for an agricultural working machine and to an agricultural working machine provided therewith.

German patent document DE 199 18 551 discloses an agricultural harvesting machine formed as a forage harvester which at its front side has an intermediate attachment that receives an agricultural working device. For preventing a support of the load of the agricultural working device exclusively over the carrier vehicle axle located forwardly in the traveling direction, at least in one embodiment support wheels are associated with the intermediate attachment. Thereby during street travel at least a part of the mass of the agricultural working device is supported on the ground through the support wheels. This has first of all the advantage that the front side carrier vehicle axle during the street travel must not support the total load of the adapted agricultural working device. The adaptation of the support wheels on the intermediate attachment of the agricultural working machine requires however an increased rigidity of this intermediate attachment, since during the travel over uneven terrain significant impact loads can occur, that must be taken by the intermediate attachment. During the operation on the field the intermediate attachment of such agricultural harvesting machines as a rule sinks to a near-ground position, so that the support wheels which are arranged on the intermediate attachment can contact the ground. When the loads which are supported on the ground by the relatively small support wheels are high, then due to their small contact surface this can lead to significant ground pressures which significantly worsens the growth conditions of the plants.

SUMMARY OF THE INVENTION

Accordingly, it is an object of the present invention to provide a support wheel arrangement for agricultural working machines and to provide an agricultural working machine provided therewith, which eliminate the above mentioned disadvantages of the prior art and ensure low ground pressure also in the region of a support wheel or support wheels.

In keeping with these objects and with others which will become apparent hereinafter, one feature of the present invention resides, briefly stated, in a support wheel arrangement in which at least one support wheel is arranged before at least one land wheel of an axle of the agricultural harvesting machine as considered in a traveling direction, and the at least one support wheel and the rearwardly arranged land wheel are surrounded by a common envelope means.

It is another feature of the present invention to provide a an agricultural working machine which has at least one receiving device for receiving an agricultural working device, at least one support wheel arrangeable in a region facing the agricultural working device, the at least one support wheel being arranged forwardly of the at least one land wheel of an axle as considered in a traveling direction, and a common envelope means surrounding the at least one support wheel and the land wheel located after the at least one support wheel as considered in the traveling direction.

Since in accordance with the present invention, at least one support wheel arranged in the region of the receiving device is located before the land wheel of the neighboring axle of the agricultural working machine and the associated support wheel and the land wheel are surrounded together by the envelope means, each support wheel and one land wheel of the neighboring vehicle axle forms a crawler track assembly that reduces the ground pressure.

In accordance with a preferable embodiment of the present invention, the support wheels are arranged at both sides of the receiving device. Thereby at least two crawler track assemblies can be arranged collision-free on the agricultural harvesting machine.

The support wheels can be arranged centrally of the corresponding land wheels. This guarantees an interference-free rotation of the envelope means.

Depending on the embodiment of the envelope means, the support wheels in accordance with a further embodiment of the present invention can have a width which either is equal to the width of the corresponding land wheels or is smaller than their width.

In accordance with an advantageous further embodiment of the invention, the support wheels can be operatively connected with the receiving device and/or the agricultural harvesting machine in a height-adjustable manner. Thereby the support wheel which is located forwardly in the traveling direction can be lifted during the travel on a loose ground to counteract a so-called "mud displacement" which occurs with crawler track assemblies.

The height adjustment can be provided in a structurally simple manner when the support wheels are in operative connection with the receiving device of the agricultural harvesting machine through a lifting cylinder unit.

The inventive envelope means can be formed in a specially simple manner, when the envelope means is formed by known rubber chains or crawler chains.

In order to increase the universality of the agricultural harvesting machine, in accordance with a further advantageous embodiment of the present invention the envelope means can be removed, so that the support wheels and the land wheels of the same axle of the agricultural working machine can be operated without the envelope means. This first of all provides the advantage when the agricultural harvesting machine must move on even and rigid soil such as streets with high traveling speed, since the crawler track assembly allows only conditionally of the high traveling speeds.

The support wheels can be formed as steerable support wheels whose steering can be blocked during crawler operation. Thereby the agricultural harvesting machine can be operated either with the crawler track assembly or separate support and land wheels, and during operation with support and land wheels a high maneuverability can be achieved.

In accordance with a further advantageous embodiment of the present invention the support wheels can be supported by supporting frames which connect the support wheels through carrier arms both with the agricultural harvesting machine and with the receiving device, and at least the carrier arms which connect the support wheels with the agricultural harvesting machine is formed telescopable. In this case it is possible to use the support frames which receive the support wheels simultaneously as a clamping device for the corresponding envelope means.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a detailed view of a support wheel arrangement of the inventive agricultural harvesting machine.

DESCRIPTION OF THE PREFERRED EMBODIMENTS

Figure 1:
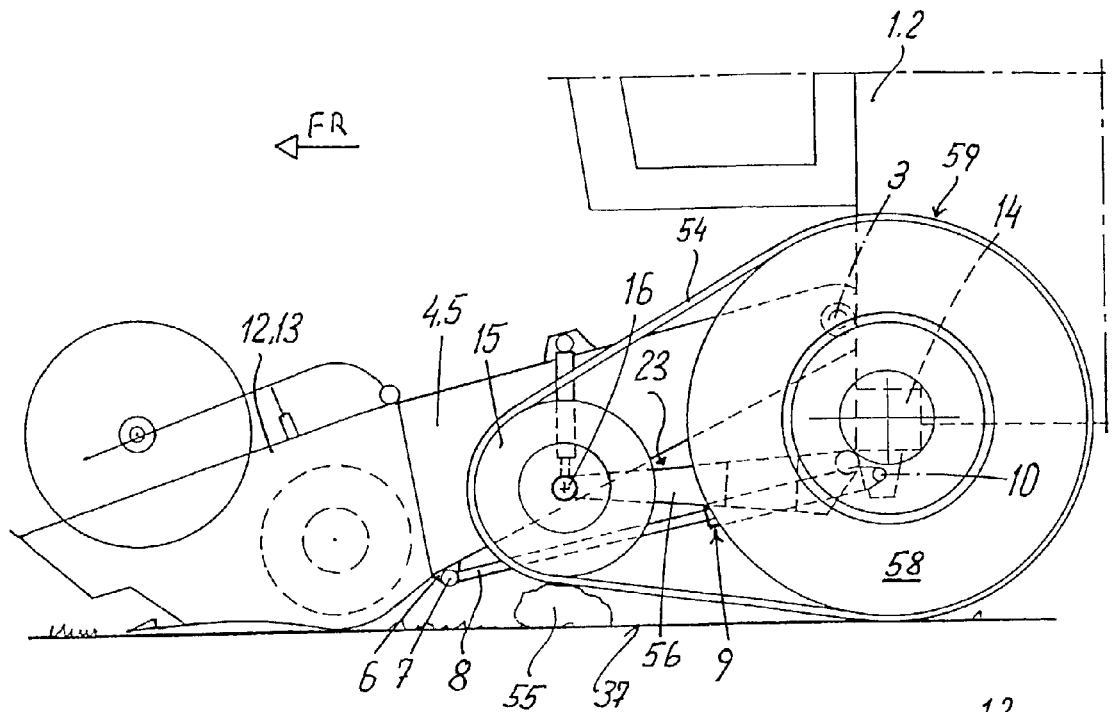
FIG. 1 is a first partial side view of an agricultural harvesting machine in accordance with the present invention.

FIG. 1 shows an agricultural harvesting machine which is formed as a harvester thresher 2. In its front region it has a swivel axle 3 extending transversely to a traveling direction FR. It supports a receiving device 5 formed as a known inclined conveyor 4, turnably in a vertical direction. Holding flanges 6 are formed on the lower side of the inclined conveyor 4. They support the front ends of piston rods 8 of lifting cylinder units 9 turnably about an axis 7 extending transversely to the traveling direction FR.

At the side of the carrier vehicle, the lifting cylinder units 9 are arranged so that they are turnably movable on the agricultural harvesting machine around axes 10 which extend also transversely to the traveling direction FR. When the lifting cylinder units 9 are loaded with pressure or unloaded from pressure, the piston rods 8 move out of the cylinders 11 of the lifting cylinder units 9 or are retracted into them. As a result, the receiving device 5 performs a turning movement in a vertical direction around the axle 3 arranged on the carrier vehicle 1. In addition to performing the turning movement of the receiving device 5, the lifting cylinder units 9 also have the function of supporting the receiving device 5 on the carrier vehicle 1.

An agricultural working device 13 is arranged at the front side of the receiving device 5 and is formed as a grain cutting track assembly 12. Such a working device is known and therefore not illustrated in detail.

In order to avoid the situation that the load of the receiving device 5 and the agricultural working device 13 adapted to it is transmitted exclusively through the lifting cylinder units 9 in the carrier vehicle 1 in the region of its front axle 14, support wheels 15 are arranged at both sides of the receiving device 5 in the region between the grain cutting track assembly 12 and the front axle 14 of the harvester thresher 2. A wheel axle 16 of each support wheel 15 is surrounded by a hub 17. A receiving flange 18 is formed on its inner side end located in the region of the support wheel 15. A vertical turning axle 20 that is formed in the simplest case as an axially secured pin 19 and extends in a vertical direction, passes through the receiving flange 18. In a rim region 21 of the support wheel 15 the vertical axle 20 also passes through a guiding lug 22 which in turn is mounted on a first inventive carrier arm 23.

In the shown embodiment such a carrier arm 23 is associated with each support wheel 15. Each carrier arm 23 at its end which supports the corresponding support wheel is formed as an arbitrarily shaped head member 24. At the carrier vehicle, an angle profile carrier 25 is welded to the head member 24. It has a cross-section which increases in direction toward the front axle 14 of the carrier vehicle 1.

Front holding flanges 26 are associated with the front axle 14 of the agricultural working machine 1. In the simplest case axles 28 which extend transversely to the traveling direction FR and formed as axlely secured pins 27, extend through the holding flange 26. Flange-shaped extension 29 of the angle profile carrier 25 extend through the distance between the neighboring holding flanges 26 so that the corresponding pins 27 support the associated angle profile carriers 25 turnably in a vertical direction. In this way the at least one first carrier arm 23 of the supporting flame 30 is connected turnably movable with the agricultural harvesting machine 1 in the region of its front axle 14.

A holding bracket 31 is formed on the head member 24 of the first carrier arm 23 at the side facing away from the corresponding support wheel 15. The corresponding holding bracket 31 supports the front-side end of the piston rod 32 of a lifting cylinder unit 33 turnably about an axis 34 extending transversely to the traveling direction FR. The cylinder end of the lifting cylinder unit 33 is mounted on the receiving device 5 of the agricultural harvesting machine turnably about an axis 35 which is also arranged transversely to the traveling direction FR. Therefore the corresponding lifting cylinder unit 33 forms a further carrier arm 36 of the support frame 30 which connects at least one support wheel 15 turnably movable with the receiving device 5 of the agricultural harvesting machine.

In this way, each support wheel 15 is connected both with the agricultural harvesting machine 1 and with the receiving device 5 through the support frame 30 which is composed of the first carrier arm 25 and at least one further carrier arm 36. Within the spirit of the present invention, the support frame 30 which is formed of the two parts in the illustrated embodiment can be also composed of one part. Such one-part supporting frame 30 is arranged turnably on the agricultural harvesting machine 1 through one or several turning axes 28 arranged transversely to the traveling direction FR. It is also possible to support the receiving device 5 on the agricultural harvesting machine 1 through only one lifting cylinder unit 9 or any number of the lifting cylinder units 9.

Since the second carrier arms 36 are formed as lifting cylinder units 33 it is guaranteed that the association of the support wheels 15 with the receiving device 5 in a vertical direction can be changed. Thereby the support wheels 15 can always contact the ground 37 independently from the position of the receiving device 5.

In accordance with a further embodiment of the present invention a steering lever 38 engages the pin 19 which forms the vertical swivel axis 20 of the support wheels 15, as shown at an upper side of FIG. 3. A stud 39 extending in a vertical direction is associated with the steering lever 38. The carrier arm 23 which supports the corresponding support wheel 15 is provided at its end associated with the front axle 14 of the agricultural harvesting machine 11 with a stud 40 extending in a vertical direction. An angular lever 41 is turnably arranged on the stud 40, and a plurality of studs 42, 43, 44 are non rotatably associated with it. A first coupling rod 45 connects the stud 39 of the steering lever 38 turnably with a stud 42 arranged on the angle lever 41. The coupling rod 45 extends in direction of the front axle 14 and the agricultural harvesting machine above and in the region of the angle profile carrier 25 of the corresponding carrier arm 25.

In the embodiment of FIG. 3 the steering lever 38, the coupling rod 45 and the angular levers 41 are associated with the neighboring support wheels 15 mirror-symmetrically relative to one another. They form correspondingly a partial steering mechanism 46, 47 for the corresponding support wheel 15. In the region of the front axle 14, the both partial steering mechanisms 46, 47 are coupled with one another through a connecting brace 48 which is turnably connected with the rearward stud 43 of the angular lever 41. A steering cylinder 49 is turnably associated with the angular lever 41 through a further stud 44. Its other end is supported also turnably about a vertical axle 50 by a holding flange 51 which is mounted on the angle profile carrier 25. When the pressure acts in the double-acting steering cylinder 49, the piston rod 52 is extended from the steering cylinder 49 or is retracted into it, and therefore the support wheels 15 perform identically directed turning movements about their vertical turning axles 20.

In order to assure that when the agricultural working device 15 is not provided the inventive support wheels still support an average load on the ground 37, the lifting cylinder units 9 which turn the receiving device 5 can be formed as double-acting lifting cylinder units. Therefore, with the piston rod 8 retracted in the cylinder 11 of the cylinder piston unit 9, the height can be fixed at which the load supported on the ground 37 by the support wheels 15 must be located. When the lifting cylinder units 9 which turn the receiving device 5 are formed as single-acting units, a pulling cylinder 53 can be arranged between the receiving device 5 and the agricultural harvesting machine 1. Under the pressure action, the inventive support wheels are forced to the bottom 37, and the magnitude of the load to be supported is determinable by the pressure action of the pulling cylinder-piston unit 53.

In accordance with the present invention, in the shown embodiment each support wheel 15 is arranged centrally of the land wheels 58 of the front-side axle 14 of the agricultural harvesting machine 1 and forwardly as considered in the traveling direction FR. Each of the support wheels 15 which are arranged at both sides of the receiving device 5 is an operative connection with the rearwardly located land wheel 58 through an envelope means 54. Therefore the support wheel 15, the corresponding land wheel 58 and the associated envelope means 54 formed in accordance with the present invention form a crawler track assembly 59.

In accordance with the present invention, the support wheels 15 and the land wheels 58 which are connected with one another by the envelope means 54 can have identical or different widths. In a not shown manner, also several support wheels 15 arranged near one another can be connected with a single land wheel 58 through the envelope means 54. This embodiment is preferable when the width of the support wheels is significantly smaller than the widths of the land wheels 58, and for a reliable guidance of the envelope means 54 approximately identical widths of the support wheels and the land wheels 8 which are in operative connection with them, must be provided.

In the simplest case the inventive envelope means 54 can be formed as known crawler chains or rubber chains.

For operating the above described steerable support wheels 15 as the crawler track assembly 59, it is required that the steering cylinder 49 must be blockable in a known manner. It is possible in this manner to operate the steerable support wheels 15 and the following land wheels 58 independently from one another or as the crawler track assembly 59 coupled with one another. This has the advantage that the agricultural harvesting machine during its use on the field can be activated so as to finely treat the ground with the crawler track assembly 59, while during traveling on a street for achieving higher traveling speeds it can be operated with the separate support wheels 15 and the rearward land wheels 58.

Since the support wheels 15 are articulately connected through the lifting cylinder units 9, 33 with the receiving device 5 and the agricultural harvesting machine 1, it is possible by pressure loading/pressure unloading of the lifting cylinder unit 33 which holds the support wheels 15 on the receiving device 5, to provide a vertical relative movement of the support wheels 15 with respect to the land wheels 58. This has the advantage that the front-side support wheels 15 can be lifted during the use in the field, so as to reduce or completely eliminate sliding of ground components 55 in the front region of the crawler track assembly 59, that worsens the traveling properties of crawler track assembly.

Figure 2:
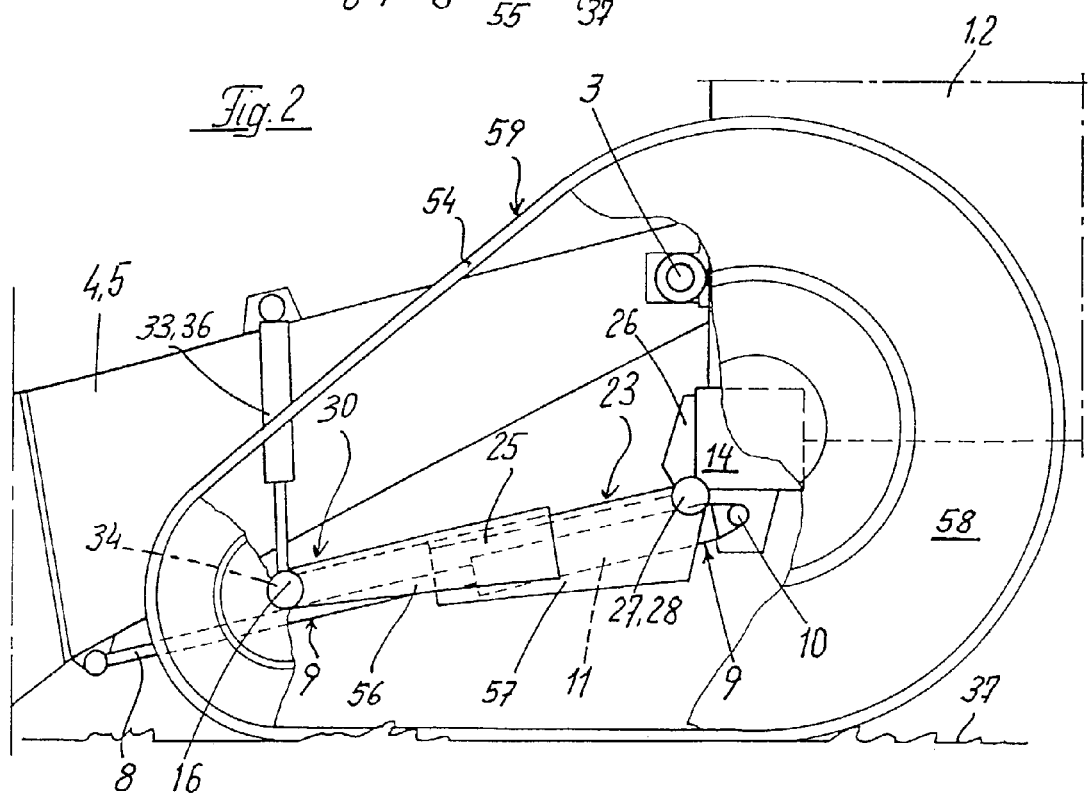
FIG. 2 is a partial further side view of the inventive agricultural harvesting machine.

The rotatable envelope means 55 are subjected to a gradual stretching with increasing operational time. Therefore, in accordance with a preferable embodiment of the invention shown in FIG. 2 the angle profile carrier 25 of the support arms 22 can be composed of a first carrier segment 56 and at least one second carrier segment 57. The carrier segments 56, 57 can be displaced relative to one another in a known and not shown way. This displacing movement can be dampened in a simple case under the action of a spring, so that on the one hand the envelope means 54 is always tensioned and on the other hand impact loads reaching in the corresponding crawler track assembly 59 can be dampened.

It will be understood that each of the elements described above, or two or more together, may also find a useful application in other types of constructions differing from the types described above.

While the invention has been illustrated and described as embodied in support wheel arrangement for agricultural working machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A supporting arrangement for an agricultural working machine with at least one receiving device formed as an inclined conveyor for receiving an agricultural working device, comprising at least one support wheel arrangeable in a region facing the agricultural working device, said at least one support wheel being arranged forwardly of at least one land wheel connected with a front drive axle of the agricultural working machine as considered in a traveling direction; and common envelope means surrounding and connecting said at least one support wheel and the at least one land wheel located after said at least one support wheel as considered in the traveling direction so that said at least one land wheel is a driving wheel and said at least one support wheel is a driven wheel, said at least one support wheel being connected to said at least one receiving device and to the front drive axle of the agricultural working machine separately and by separate connecting means, said at least one support wheel being located between the agricultural working device and said at least one land wheel and supporting at least a part of a load of the agricultural working device through the receiving device connecting means.

2. A supporting arrangement as defined in claim 1; and further comprising at least one further support wheel spaced from said first mentioned support wheel in a transverse direction, and also at least one land wheel, and at least one further envelope means, each of said envelope means enclosing a respective one of said support wheels and a respective one of said land wheels associated with at least one axle of the agricultural working machine.

3. A supporting arrangement as defined in claim 1, wherein said at least one support wheel is arranged substantially centrally of the at least one land wheel as considered in the traveling direction.

4. A supporting arrangement as defined in claim 1, wherein said at least one support wheel and the at least one land wheel have different widths.

5. A supporting arrangement as defined in claim 1; and further comprising at least one further support wheel which is spaced from said first mentioned support wheel transversely to the traveling direction, said support wheels being height-adjustable; and further comprising means for height adjustment of said support wheels.

6. A supporting arrangement as defined in claim 1, wherein said envelope means which surround said at least one support wheel and the at least one land wheel include a crawler chain.

7. A supporting arrangement as defined in claim 1, wherein said envelope means which surround said at least one support wheel and the at least one land wheel include a rubber chain.

8. A supporting arrangement as defined in claim 1; and further comprising at least one further support wheel and at least one further land wheel, said support wheels and the land wheels being operative without said envelope means.

9. A supporting arrangement as defined in claim 1, wherein said support wheel and the land wheel are operatable without said envelope means.

10. A supporting arrangement as defined in claim 1, wherein said at least one support wheel is steerable; and further comprising means for steering said at least one support wheel.

11. A supporting arrangement for an agricultural working machine as defined in claim 1; and further comprising height adjustment means for adjusting a height of said at least one support wheel, said height adjusting means including at least one lifting cylinder unit having one end mountable en the at least one receiving device and another end connected to said at least one support wheel so as to height-adjustably connect said at least one support wheel with the receiving device, said at least one support wheel being located between the agricultural working device and said at least one land wheel and supports at least a part of a load of the agricultural working device.

12. A supporting arrangement as defined in claim 11; and further comprising a supporting frame which supports said at least one support wheel on the front axle of the agricultural working machine, said other end of said height adjustment means being connected with said support frame.

13. An agricultural working machine, comprising at least one receiving device for receiving an agricultural working device; a front axle having at least one land wheel; a supporting wheel arrangement including at least one support wheel; said at least one support wheel being arranged forwardly of said at least one land wheel connected with a front drive axle as considered in a traveling direction; and common envelope means surrounding and connecting said at least one support wheel and said at feast one land wheel located after said at one support wheel as considered in the traveling direction so that said at least one land wheel is a driving wheel and said at least one support wheel is a driven wheel, said at least one support wheel being connected to said at least one receiving device and to said front drive axel of the agricultural working machine separately and by separate connecting means, said at least one support wheel being located between the agricultural working device and said at least one land wheel and supporting at least a part of a toad of the agricultural working device through receiving device connecting means.

14. An agricultural working machine as defined in claim 13; and further comprising height adjustment means for adjusting a height of said at least one support wheel, said height adjustment means including at least one lifting cylinder unit having one end mounted on said at least one receiving device and another end connected with said at least one support wheel so as to height adjustably connect said at least one support wheel with said receiving device, said at least one support wheel being located between the agricultural working device and said at least one land wheel and supports at least a part of a load of the agricultural working device.

15. An agricultural working machine as defined in claim 14; and further comprising a supporting frame which supports said at least one support wheel on the agricultural working machine, said other end of said height adjustment means being connected with said support frame.

16. A supporting arrangement for an agricultural working machine with at least one receiving device formed as an inclined conveyor for receiving an agricultural working device, comprising at least one support wheel arrangeable in a region facing the agricultural working device, said at least one support wheel being arranged forwardly of at least one land wheel connected with a front drive axle of the agricultural working machine as considered in a traveling direction; and common envelope means surrounding and connecting said at least one support wheel and the at least one land wheel located after said at least one support wheel as considered in the traveling direction so that said at least one land wheel is a driving wheel and said at least one support wheel is a driven wheel, said at least one support wheel being connected to said at least one receiving device and the front drive axle of the agricultural working machine separately and by separate connecting means, said at least one support wheel being located between the agricultural working device and said at least one land wheel and supporting at least a part of a load of the agricultural working device through the receiving device connecting means; the front drive axle connecting means comprising a first carrier arm and the receiving device connecting means comprising at least one further carrier arm supporting said at least one support wheel.

17. A supporting arrangement for an agricultural working machine with at least one receiving device formed as an inclined conveyor for receiving an agricultural working device, comprising at least one support wheel arrangeable in a region facing the agricultural working device, said at least one support wheel being arranged forwardly of at least one land wheel connected with a front drive axle of the agricultural working machine as considered in a traveling direction; and common envelope means surrounding and connecting said at least one support wheel and the at least one land wheel located after said at least one support wheel as considered in the traveling direction so that said at least one land wheel is a driving wheel and said at least one support wheel is a driven wheel, said at least one support wheel being connected to said at least one receiving device and the front drive axle of the agricultural working machine separately and by separate connecting means, said at least one support wheel being located between the agricultural working device and said at least one land wheel and supports at least a part of a load of the agricultural working device; and connecting means for connecting said at least one support wheel to said at least one receiving device and to said front drive axle, said connecting means including first connecting means composed of a carrier arm with a head member connected to said at least one support wheel and an angle profile carrier extending from said head member and connected with a holding flange associated with said front axle so as to connect said at least one support wheel with said front axle, and second connecting means composed of a lifting cylinder unit having one end turnably connected to said head member and another end connected to said receiving device so as to connect said at least one support wheel to said receiving device, said second connecting means supporting at least a part of a load of the agricultural working device.

18. An agricultural working machine, comprising at least one receiving device for receiving an agricultural working device; a front axle having at least one land wheel; a supporting wheel arrangement including at least one support wheel; said at least one support wheel being arranged forwardly of said at least one land wheel connected with a front drive axle as considered in a traveling direction; and common envelope means surrounding and connecting said at least one support wheel and said at least one land wheel located after said at least one support wheel as considered in the traveling direction so that said at least one land wheel is a driving wheel and said at least one support wheel is a driven wheel, said at least one support wheel being connected to said at least one receiving device and to said front drive axle of the agricultural working machine separately and by separate connecting means, said at least one support wheel being located between the agricultural working device and said at least one land wheel; the front drive axle connecting means comprising a first carrier arm and the receiving device connecting means comprising at least one further carrier arm and supporting said at least one support wheel; the receiving device connecting means supporting at least a part of a load of the agricultural working device.

19. An agricultural working machine, comprising at least one receiving device for receiving an agricultural working device; a front axle having at least one land wheel; a supporting wheel arrangement including at least one support wheel; said at least one support wheel being arranged forwardly of said at least one land wheel connected with a front drive axle as considered in a traveling direction; and common envelope means surrounding and connecting said at least one support wheel and said at least one land wheel located after said at least one support wheel as considered in the traveling direction so that said at least one land wheel is a driving wheel and said at least one support wheel is a driven wheel, said at least one support wheel being located between the agricultural working device and said at least one land wheel; and connecting means for connecting said at least one support wheel to said at least one receiving device and to said front drive axle, said connecting means including first connecting means composed of a carrier arm with a head member connected to said at least one support wheel and an angle profile earner extending from said head member and connected with a holding flange associated with said front axle so as to connect said at least one support wheel with said front axle, and second connecting means composed of a lifting cylinder unit having one end turnably connected to said head member and another end connected to said receiving device so as to connect said at least one support wheel to said receiving device, said second connecting means supporting at least a part of a load of the agricultural working device.

\* \* \* \* \*